No. 608,063. Patented July 26, 1898.
H. H. MINTZER.
FISHING FLOAT.
(Application filed Nov. 13, 1897.)
(No Model.)
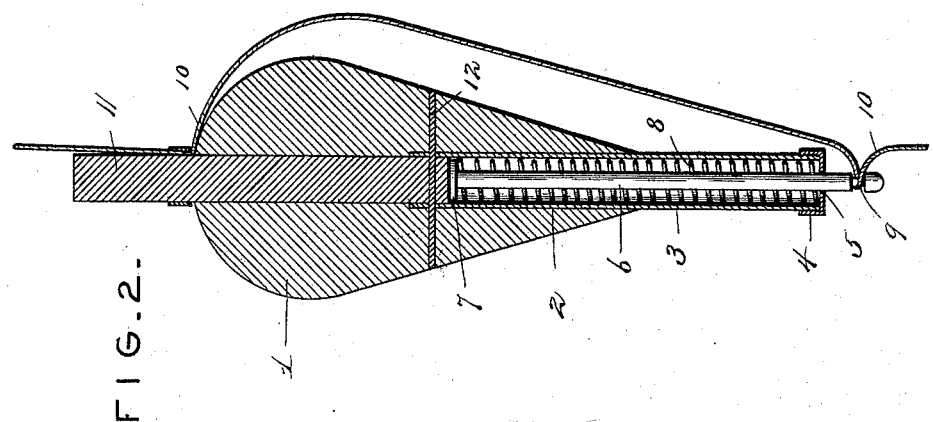
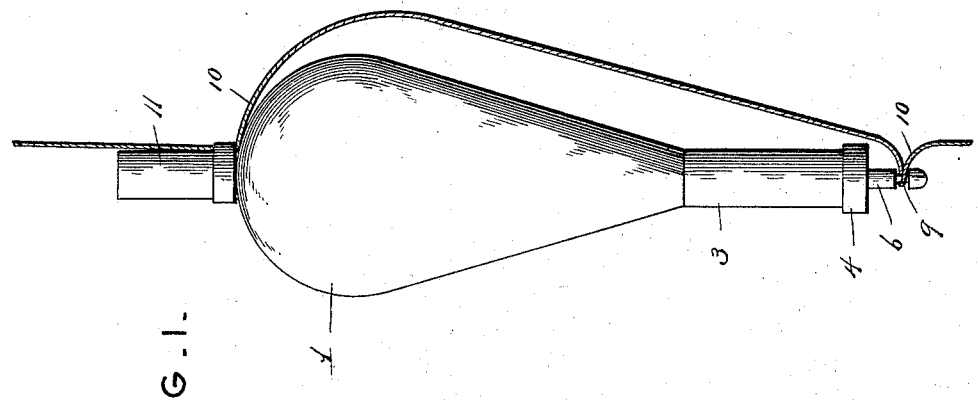
Witnesses
Harry L. Amer.
Victor J. Evans.
Inventor
Harry H. Mintzer.
by V. D. Stockbridge
his Attorney.

UNITED STATES PATENT OFFICE.

HARRY H. MINTZER, OF PHILADELPHIA, PENNSYLVANIA.

FISHING-FLOAT.

SPECIFICATION forming part of Letters Patent No. 608,063, dated July 26, 1898.

Application filed November 13, 1897. Serial No. 658,482. (No model.)

*To all whom it may concern:*

Be it known that I, HARRY H. MINTZER, a citizen of the United States, residing at Philadelphia, in the county of Philadelphia and State of Pennsylvania, have invented certain new and useful Improvements in Fishing-Floats; and I do hereby declare the following to be a full, clear, and exact description of the invention, such as will enable others skilled in the art to which it appertains to make and use the same.

This invention relates to fishing-line floats; and the object in view is to provide, in connection with a float, an independently-movable line carrier or holder which is supported with relation to the float in such manner as to give the necessary jerk or pull upon the line for catching or impaling a fish upon the hook.

The detailed objects and advantages of the invention will be pointed out in the ensuing description.

The invention consists in a fishing-line float embodying certain novel features and details of construction, as hereinafter fully described, illustrated in the drawings, and incorporated in the claim.

In the accompanying drawings, forming a part of this specification, Figure 1 is a side elevation of the improved float, and Fig. 2 is a longitudinal section through the same.

Similar numerals of reference designate corresponding parts in both views.

Referring to the drawings, 1 designates the main body of the float, which may be of any suitable material or of any usual or preferred form.

In carrying out the present invention the lower end of the float is provided with a central longitudinal bore or recess 2, in which is fitted a tube 3, preferably extending below the lower end of the float proper and having its lower end closed by means of a cap 4, screw-threaded thereon or otherwise connected thereto, and provided with a central opening 5, through which operates a rod 6, forming the line holder or carrier. The rod or holder 6 is provided at its inner end with an enlarged head 7, and between said head and the cap 4 is interposed a spiral spring 8, which is coiled around the rod 6 and which exerts its tension to lift said rod until the head 7 thereof comes into contact with the upper or inner end of the bore or recess 2. The lower and projecting extremity of the rod 6 is provided with an annular groove 9, in which the fishing-line 10 may be secured, sufficient slack being left in the line 10 between its point of connection with the rod 6 and the upper stem 11 of the float to admit of the reciprocation of the holder or carrier 6.

12 designates a pin or rivet extending transversely through the float 1 and also through the tube 3 for preventing displacement of the tube.

From the foregoing description it will be seen that when a fish grasps the bait on the hook and starts off with it this movement is resisted by the spring 8 and the line is drawn backward with a jerk by said spring, thus driving the point of the hook into the flesh or gills of the fish. Should the nibble of the fish be felt by the fisherman and he should give a sudden jerk upon the line, the spring 8 will allow the line carrier or holder to yield, thus preventing the hook from being jerked through and out of the gills or flesh of the fish, thereby insuring the catching of the fish.

It will of course be understood that the tube 3 may be dispensed with and the spring and line holder or carrier included entirely within the float. These and other changes in the form, proportion, and minor details of construction may be resorted to without departing from the principle or sacrificing any of the advantages of the invention.

Having thus described my invention, what I claim as new, and desire to secure by Letters Patent, is—

The combination with a fishing-line float having a longitudinal recess in its lower end, of a metallic tube fitting in said recess and extending below the lower end of the float, a pin extending transversely through the float and tube, a centrally-apertured cap upon the lower end of said tube, a rod working longitudinally in the tube and forming a line carrier or holder, a head on the inner end of said rod, and a spring coiled around the said rod within the tube between the head of the rod and the cap on the tube, substantially as described.

In testimony whereof I affix my signature in presence of two witnesses.

HARRY H. MINTZER.

Witnesses:
  C. DUNK,
  HARRY OTTO BAHM.